May 17, 1960     J. W. BROWN, JR., ET AL     2,936,517
METHOD AND APPARATUS FOR BRAZING FINS TO TUBES
Filed Feb. 16, 1955     2 Sheets-Sheet 1

INVENTORS.
JOHN W. BROWN, JR.
ARVID C.K. NIHLEN
BY
ATTORNEYS.

May 17, 1960   J. W. BROWN, JR., ET AL   2,936,517
METHOD AND APPARATUS FOR BRAZING FINS TO TUBES
Filed Feb. 16, 1955   2 Sheets-Sheet 2

INVENTORS.
JOHN W. BROWN, JR.
ARVID C. K. NIHLEN
BY
ATTORNEYS.

United States Patent Office 2,936,517
Patented May 17, 1960

2,936,517

METHOD AND APPARATUS FOR BRAZING FINS TO TUBES

John W. Brown, Jr., Lakewood, and Arvid C. K. Nihlen, Oberlin, Ohio, assignors to Brown Fintube Company, Elyria, Ohio, a corporation of Ohio Application February 16, 1955, Serial No. 488,672

8 Claims. (Cl. 29—157.3)

This invention relates to the manufacture of heat exchanger tubes with external fins and more particularly to a method and apparatus for bonding longitudinally extending fins to the exterior of heat exchanger tubes by means of a bonding metal that is fused in the bonding operation. This type of bonding is hereinafter referred to as "brazing," and the term "brazing" as used herein is intended to cover bonding methods ordinarily known as soldering, silver soldering, brazing, copper brazing, hydrogen brazing, and the like.

Heat exchanger tubes with longitudinally extending fins are used for many purposes, but heretofore the manufacture of tubes in which longitudinally extending external fins have been brazed to the tubes has required rather expensive equipment for holding the fins on the tubes during the brazing operation and the operation has required considerable time, with resulting expense. A general object of the present invention, therefore, is to provide an improved method and apparatus for brazing longitudinally extending fin members to the exterior of tubes. Another object is the provision of such a method which can be carried out with comparatively simple and inexpensive apparatus. A further object is the provision of a method and apparatus whereby longitudinally finned heat exchanger tubes of excellent heat exchange characteristics can be produced rapidly and at reasonable cost.

In order to provide a good brazed connection, it is necessary that the surfaces to be joined together be firmly in contact with each other at the time that the brazing heat is applied. Separate longitudinally extending fin members present a problem in holding because of their length and because they must be properly spaced from each other and individually held. The difficulty of holding fin members in contact with the exterior of the tube is increased for the reasons that the dimensions of the fin members may not be held with a great degree of accuracy and furthermore the tubing may not be of uniform diameter or roundness throughout. Seamless tubing, which is used widely in heat exchangers, ordinarily is slightly oval rather than round in cross-section, and the major diameter of the oval does not remain in one plane but usually rotates along the length of the tube. Thus, the diameter of the tube in a given plane may vary substantially, and the result of this is that a longitudinal element of the tube is not a straight line but is an undulating or curve line.

A straight longitudinal fin cannot be successfully brazed to such a surface throughout the contacting area of the fin and tube unless the fin is deformed slightly, so that it conforms to and makes firm contact with the undulating outer surface of the tube. The difficulty of holding the fins in place against the tube is, of course, increased if the fins themselves are inaccurate.

According to the present invention, the difficulties with prior methods and apparatus are eliminated, and a method and apparatus whereby fins may be rapidly and effectively brazed to the outer surfaces of heat exchanger tubes is provided by supporting a group of channel-section fin members against the outer surface of the tube by means of a resilient metal member which embodies a plurality of convolutions that are spaced along the length of the fin members and which have the property of expanding and contracting more or less independently of each other, so that the fin members are urged firmly into contact with the outer surface of the tube regardless of reasonable variations in tube diameter and dimensions of the fin member. Such a member in its simplest and preferred form comprises a coil spring. In carrying out the method, the length of the coil spring is shortened to expand it diametrically, a group of channel-section fin members are disposed circumferentially about the tube, which has previously been cleaned, and temporarily held in position either manually or by appropriate fixtures; and then the expanded spring is slipped over the assembly of fin members and tube.

After the spring and the fins have been positioned around the tube, the length of the spring is increased so that the convolutions of the spring contract, engage the outer surfaces of the fin members, and force the inner or base portions of the fin members into firm engagement with the outer surface of the tube. If desired, the tube and fins may be vibrated as the convolutions contract, to enable the spring better to seat itself on the fins and to conform to variations in the assembled parts. Preferably the portions of the fin members that engage the tube are tinned with the bonding metal before assembly with the tube, and flux is applied to the surfaces to be joined. The assembly, with the spring holding the fin members in position on the exterior of the tube, is then heated, for example, by positioning an elongated electric heating element within the tube and heating the tube from within to heat and fuse the bonding metal. Upon cooling and solidification of the bonding metal, the fin members are firmly bonded to the outer surface of the tube throughout their contacting areas. Thereafter, the length of the spring is shortened to cause it to expand diametrically and the spring is then removed from the tube.

Referring to the drawings.

Figure 1:
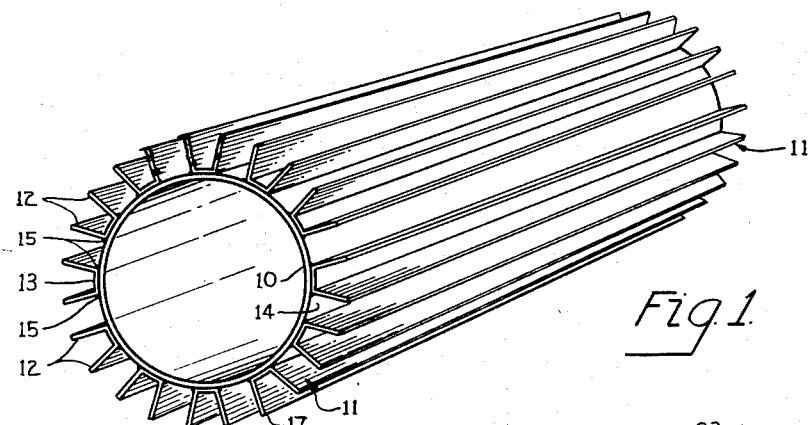
Figure 1 illustrates a preferred form of tube made according to our invention.

As illustrated in Figure 1, a heat exchanger tube made according to our invention may comprise a tube 10, to the exterior of which a plurality of longitudinally extending channel-section fin members 11 are secured. Each fin members comprises a pair of fins 12 and a base portion 13, the base portion being brazed to the exterior surface 14 of the tube 10. The fin members are spaced circumferentially around the tube and extend generally longitudinally of the tube, thus providing extended heat exchange surface. The brazed connections between the bases 13 of the fin members 11 and the outer surface 14 of the tube provide metallic paths of substantial area between each member of the tube and thus insure efficient transfer of heat between the fin members and the tube. As shown in Figure 1, it is possible, by supplying sufficient bonding metal, to carry out the brazing operation so that fillets 15 are formed at the juncture of the fin members and the tube, thus providing larger paths for heat transfer between the fin bases and the tube. The tubes have high heat exchange capacity per unit of length as compared to unfinned tubes and are extremely useful in the construction of heat exchangers. The fins and the tubes can be composed of any metals, ferrous or non-ferrous, that are capable of being bonded together by brazing.

Figure 2:
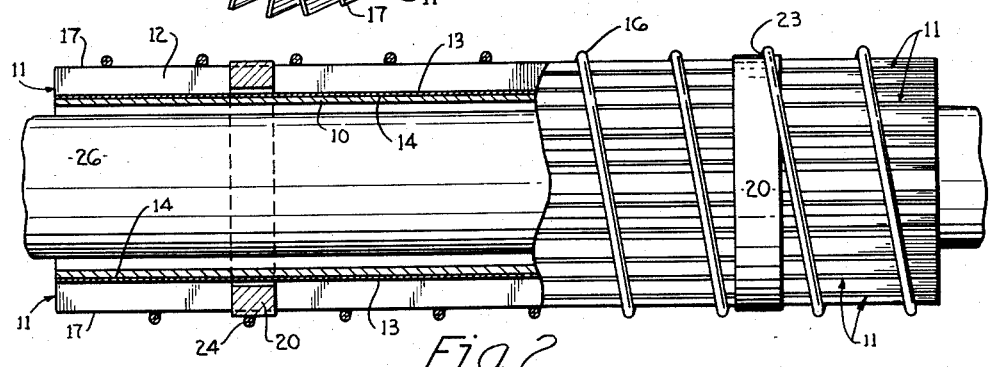
Figure 2 is a longitudinal section through the tube of Figure 1, showing the fin members and spring in place thereon preparatory to brazing.
Figure 3:
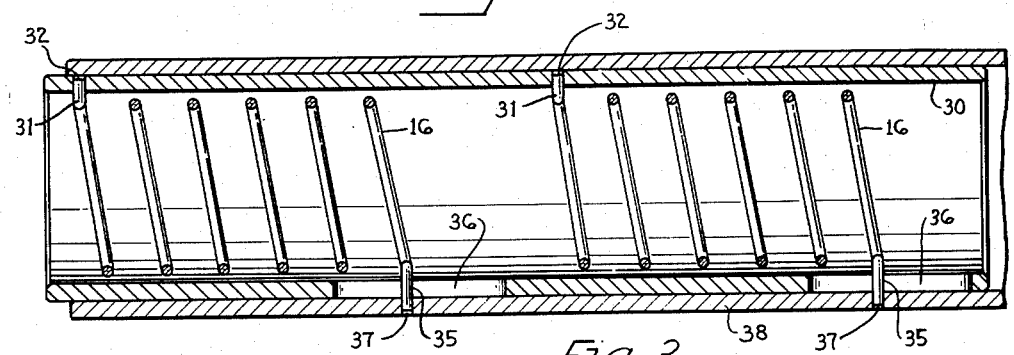
Figure 3 is a longitudinal section through a preferred form of tool for expanding and contracting the resilient member on the exterior of the fins.
Figure 4:
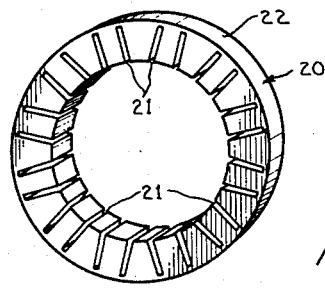
Figure 4 is a perspective view of a collar or jig for aligning the fins along the exterior of the tube.

Figures 2, 3 and 4 somewhat diagrammatically illustrate a method and apparatus that may be employed in brazing the fin members 11 to the exterior surface 14 of the tube 10. The brazing operation is accomplished by holding the fin members in firm engagement with the outer surface of the tube by means of a coil spring 16, each convolution of which, as shown in Figure 2, engages the outer edges 17 of the fin portions 12 of the fin members 11. The fin members are properly spaced circumferentially about the tube by means of guide collars or jigs 20, one of which is illustrated in Figure 4. Each guide collar 20 consists of a metal ring of appropriate diameter which is provided with slots 21 to receive the fins 12 of the fin members 11. The slots are circumferentially spaced to hold the fin members in the desired spacing, and the collars are simply slipped over the fin members while they are held around the circumference of the tube, either manually or by a temporary mechanical support. The slots 21 extend close to the outer surface 22 of the collars, so that the outer diameter of the collars does not greatly exceed the diameter of the cylinder defined by the outer edges 17 of the fin members.

In the form of the invention illustrated, the fin members are parallel to the axis of the tube, the slots in the collars being longitudinally aligned. However, if desired, the fin members can be disposed at a slight angle to the axis of the tube; i.e., can be extended helically along the tube, in which case the collars 20 are rotated with respect to each other to the degree necessary to give the desired pitch to fin members.

The collars 20 hold the fin members in proper circumferential position while the spring 16 is applied thereto. The normal diameter of the spring 16 is less than the normal diameter of the cylinder defined by the outer edges 17 of the fin members; in order to apply the spring to the assembly, the spring is longitudinally compressed to increase its diameter and while it is compressed, the assembly of fin members and tube along with the collars 20 is inserted within the spring. Inasmuch as the outer diameter of the collars does not greatly exceed the diameter of the edges of the fins, the spring can without difficulty encompass the guide members along with the fins, as shown particularly at 23 and 24 in Figure 2.

When the spring is released each convolution endeavors to contract to its normal diameter as the length of the spring increases. In so contracting, each convolution engages and urges the fin members inwardly against the outer surface of the tube. The entire spring is resilient, so that the convolutions can seat themselves more or less independently on the outer edges of the fins. One convolution can be offset slightly from an adjacent convolution if that is necessary for proper seating. Furthermore, the convolutions can contract to varying degrees and thus, within reasonable limits, can contract to compensate for variations in the diameter of the tube or variations in the dimensions of the fin members. The convolutions also can take slightly oval, elliptical or other out-of-round shapes in conformation to the outer edges of the fins and, hence, can urge all parts of the fins inwardly into engagement with the outer surface of the tube.

In effect, the spring provides inwardly acting forces which, within the tolerance ordinarily found in heat exchanger tubing and with reasonable accuracy in the manufacture of the fin members, can be considered as essentially independent of each other. Thus, the engagement between the spring and the outer edges 17 of the fins provides the contact needed for successful brazing regardless of the usual variations found in commercial tubing and in the fin members. Furthermore, the resilience of the convolutions gives a following action if the fins should be required to move inwardly to maintain contact as the fusing of the bonding metal disposed between the fins and the exterior surface of the tube takes place.

The brazing can be carried out in various manners. The entire assembly of tube, fin members, and spring can be heated to brazing temperature and then cooled, but preferably, the operation is carried out by disposing a resistance electrical heating element 26 within the tube and passing electric current through the heating element to cause it to heat the tube from within, fusing the bonding metal and bonding the fins to the tube. With this method the expansion of the tube that takes place under the influence of heat increases the force with which the fins are held against the tube by the spring, inasmuch as the spring is in a zone where it remains much cooler than the tube. Furthermore, the spring is not subjected to destructive heat when this method is employed, thus giving longer life to the spring.

While a single spring may be employed to retain the fins on the tube, we find it more convenient from a handling standpoint to utilize a series of springs 16 as shown in Figure 3. These springs are disposed within a guide tube 30, one end 31 of each spring being fixed within one of the recesses 32 in the wall of tube 30, while the other end 35 of each spring extends through one of the slots 36 in the wall of the tube. The ends 35 engage within openings 37 in the wall of an outer or actuating tube 38.

With this arrangement the springs can be simultaneously compressed or elongated, if desired, by relative movement between the guide tube 30 and the actuating tube 38. If the actuating tube 38 is moved to the left, as shown in the drawing, the springs are compressed and expanded and endeavor to resume their normal length and normal diameter when the actuating tube is permitted to resume the position shown in the drawing. If the actuating tube is moved to the right in the arrangement shown in the drawing, the springs are elongated and caused to contract.

Any suitable mechanism can be used to move the actuating tube with respect to the guide tube, such as, for example, a screw or a fluid pressure cylinder acting between the two tubes. Ordinarily, the springs are compressed to permit the assembly of tube and fins within the springs and then released during the brazing operation. However, if desired, the springs can be made of such diameter that the assembly of tube and fins can be inserted within them while they are of their normal diameter and then the springs elongated to cause them to diametrically contact while the brazing operation is carried out. After the brazing operation has been completed, the springs are caused to expand and the entire member is removed from the tube and fins.

This type of apparatus is particularly convenient for where the tube is of considerable length. The comparatively short springs 16 act more or less independently of one another and seat themselves more or less individually. If desired, the springs can be spaced so that the guides 20 or similar guiding devices come in the spaces between the spring members.

The present method can be utilized in the production of tubes having fins on both the inside and outside surfaces thereof. The internal fins preferably are applied to the tube by the method and apparatus described and claimed in our co-pending application Serial No. 488,560, filed of even date herewith, a single brazing operation being employed to simultaneously bond the fins to the exterior and interior of the tube.

Figure 5:
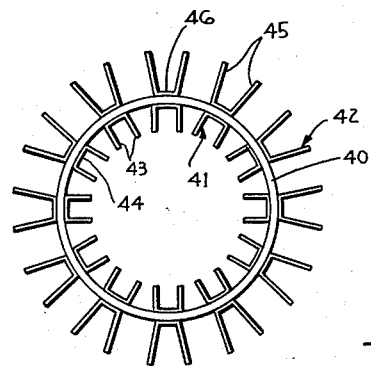
Figure 5 is an end elevation of a tube made according to our invention and embodying internal and external fins.

A tube with inside and outside fins is shown in Figure 5 and comprises a tube 40 having internal fin members 41 and external fin members 42 thereon. Internal fin members 41 comprise fin portions 43 and base portions 44; the external fin members 42 comprise fin portions 45 and base portions 46. In securing the fins to the tubes, the internal fin members are held in place within the tube by means of a spring 48 which acts to urge the fin members outwardly against the tube 40 as described and claimed in our aforesaid co-pending application while the outer fin members 42 are held in place by means of a spring 49 in the manner previously described herein. Bonding metal is supplied to the contacting surfaces of the fins, preferably by tinning the base portions thereof as before, and the assembly is heated to fuse the bonding metal and simultaneously bond both the exterior fins 42 and the interior fins 41 to the tube.

Figure 6:
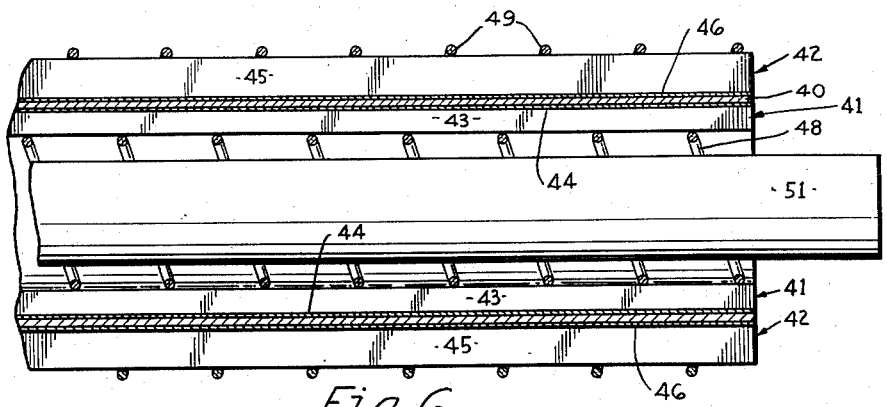
Figure 6 is a longitudinal section illustrating one stage in the production of the tube of Figure 5.

The heating operation can be carried out in a furnace, if desired, or as shown in Figure 6, by means of an electrical resistance heating element 51 disposed within the assembly. In this case one or both of the springs will be subjected to the brazing heat. Hence, the springs must be made of an alloy that can withstand the brazing temperature.

Figure 7:
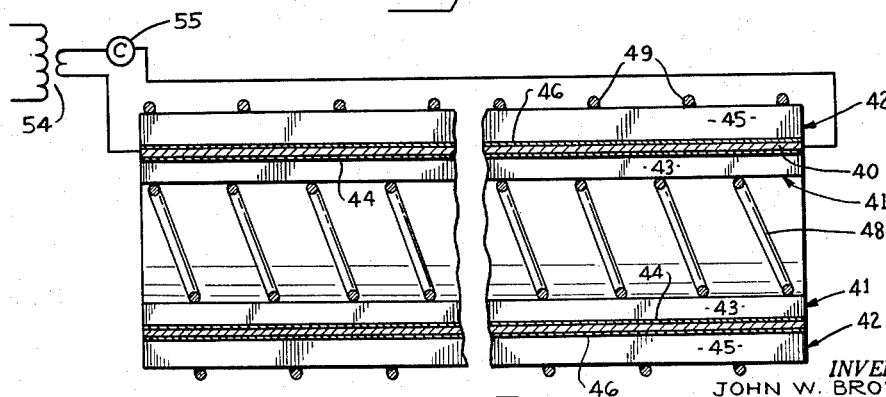
Figure 7 is a similar longitudinal section showing one stage in a modified method of production of the tube shown in Figure 5.

Another method of heating the assembly and carrying out the brazing operation is illustrated in Figure 7. Here the tube 40 itself constitutes an electric resistance element. A heavy current is caused to flow through the tube, the current being supplied by an appropriate transformer 54 and controlled through a control such as a thyratron control 55. When this method of heating is employed, the springs remain at a much cooler temperature than the brazing temperature reached by the tube, because the springs are spaced from the tube by the heat dissipating fins 43 and 45.

From the foregoing description, it will be evident that the invention provides a simple and effective method whereby fins can be brazed to the exterior of tubes. The fins are held in place accurately during the brazing operation, and resilient convolutions of the springs or other members employed to hold the fins in place constantly urge the fin members inwardly toward the tube. Because of the resilience of the convolutions, the fins are moved inwardly if such motion is permitted by the fusing of the brazing metal disposed between the fins and the exterior surface of the tube. Thus, there is a following action which insures that the fin members will always be held in the required firm contact with the exterior of the tube.

The invention produces tubes of highly advantageous character, the excellent bond provided insures good heat transfer between the fins and the tube wall, and the tubes produced by this method may also be provided with internal fins by a simultaneous or a subsequent operation if so desired.

Those skilled in the art will appreciate that various changes and modifications can be made in the preferred forms of the invention disclosed herein without departing from the spirit and scope of the invention. The essential characteristics of the invention are defined in the appended claims.

We claim:

1. The method of making externally finned tubes which includes the steps of providing a retaining member comprising a continuous member wound into a series of resilient convolutions, diametrically expanding said convolutions, providing separate fin members each having a base portion and a fin portion, assembling a group of such fin members with a tube with the base portions of each fin member engaging the exterior of the tube and extending longitudinally thereof, positioning said retaining member around said tube and fin members with said convolutions in longitudinally spaced engagement with the fin portions of said fin members, diametrically contracting said convolutions to cause them to urge said fin members inwardly into engagement with the outer surface of said tube, supplying bonding metal to the contacting surfaces of said fin members and said tube, and fusing the bonding metal to bond the fin members to the tube.

2. In the manufacture of tubing having separate longitudinally extending fin members brazed to the exterior thereof, the steps of providing a plurality of separate fin members having base portions adapted to be brazed to the exterior of a tube and fin portions extending from the base portions, tinning said base portions with a bonding metal, extending said fin members longitudinally along the exterior of the tube with the fin members circumferentially spaced around the tube and the fin portions extending outwardly, providing a coil spring having, at the length it occupies during the operation of brazing the fin members to the tube, a normal external diameter less than the diameter of the circle defined by the outer edges of said fin portions of said fin members when the base portions thereof are in engagement with the outer surface of the tube, holding the spring at a reduced length and increased diameter, inserting the assembly of tube and fin members within the spring, lengthening the spring to cause it to resiliently urge the fin members into engagement with the exterior of the tube, and fusing the bonding metal to braze the bases of the fin members to the tube.

3. Apparatus of the type described comprising a tubular guide member, a plurality of coil springs loosely fitting within said guide member, one end of each spring being secured to said guide member, said guide member having a series of longitudinal slots, one slot being disposed adjacent the other free end of each spring, the free end of each spring extending through the adjacent slot, and an actuating member extending along the exterior of said guide member, said actuating member engaging the free ends of the springs that project through said slots, whereby the length of all of the springs can be changed simultaneously by moving the actuating member longitudinally with respect to the guide member.

4. The method of making a tube with internal and external longitudinally extending fins thereon which includes the steps of resiliently urging a plurality of separately formed longitudinally extending fin members inwardly into engagement with the outer surface of a tube simultaneously throughout substantially the entire length of the fin members, at the same time resiliently urging a plurality of longitudinally extending fin members outwardly into engagement with the inner surface of the tube by means separate from the fin members themselves, supplying bonding metal to the contacting surfaces of the fin members and the tube, and fusing the bonding metal while the fin members are so held, thereby brazing the fin members to the outer and inner surfaces of the tube.

5. The method according to claim 4 wherein the fin members are held on the exterior of the tube by a coil spring engaging the outer edges of the fin members at longitudinally spaced points.

6. The method according to claim 4 wherein the fin members are held in engagement with the inner surface of the tube by a coil spring.

7. The method according to claim 4 wherein the tube is heated by passing an electric current therethrough.

8. The method according to claim 7 wherein the fin members are held on the exterior of the tube and in engagement with the inner surface of the tube by coil springs.

References Cited in the file of this patent

UNITED STATES PATENTS

| | | |
|---|---|---|
| 166,294 | Orum | Aug. 3, 1875 |
| 174,609 | Wright | Mar. 7, 1876 |
| 1,508,342 | Lee | Sept. 9, 1924 |

(Other references on following page)

UNITED STATES PATENTS

| | | | |
|---|---|---|---|
| 1,651,403 | Mougey | Dec. 6, | 1927 |
| 1,984,938 | Mason et al. | Dec. 18, | 1934 |
| 2,321,308 | Miller | June 8, | 1943 |
| 2,396,795 | Lea | Mar. 19, | 1946 |
| 2,474,967 | Bachleda | July 5, | 1949 |
| 2,483,454 | Brown | Oct. 4, | 1949 |
| 2,682,244 | Fortner | June 29, | 1954 |
| 2,693,026 | Simpelaar | Nov. 2, | 1954 |
| 2,703,921 | Brown | Mar. 15, | 1955 |
| 2,716,276 | Brown | Aug. 30, | 1955 |
| 2,718,864 | Fiske | Sept. 27, | 1955 |
| 2,731,709 | Gaddis et al. | Jan. 24, | 1956 |